US011565707B2

(12) United States Patent
Kusaka et al.

(10) Patent No.: US 11,565,707 B2
(45) Date of Patent: Jan. 31, 2023

(54) OCCUPANT BEHAVIOR DETERMINING APPARATUS, OCCUPANT BEHAVIOR DETERMINING METHOD, AND STORAGE MEDIUM

(71) Applicant: HONDA MOTOR CO., LTD., Tokyo (JP)

(72) Inventors: Takashi Kusaka, Wako (JP); Yuki Kagiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/190,940

(22) Filed: Mar. 3, 2021

(65) Prior Publication Data

US 2021/0276570 A1    Sep. 9, 2021

(30) Foreign Application Priority Data

Mar. 5, 2020    (JP) .............................. JP2020-037337

(51) Int. Cl.
B60W 40/09    (2012.01)
G06V 20/20    (2022.01)
G06V 20/59    (2022.01)

(52) U.S. Cl.
CPC ............. *B60W 40/09* (2013.01); *G06V 20/20* (2022.01); *G06V 20/597* (2022.01); *B60W 2540/225* (2020.02); *B60W 2540/229* (2020.02); *B60W 2540/30* (2013.01)

(58) Field of Classification Search
CPC ........... B60W 40/09; B60W 2540/225; B60W 2540/229; B60W 2540/30; G06V 20/20; G06V 20/597; G06V 40/16
See application file for complete search history.

(56) References Cited

U.S. PATENT DOCUMENTS

| 11,144,749 | B1* | 10/2021 | Lo ........................... H04N 7/181 |
| 2017/0368936 | A1* | 12/2017 | Kojima .................. B60W 40/08 |
| 2019/0065873 | A1* | 2/2019 | Wang ..................... G06V 10/82 |
| 2019/0370578 | A1* | 12/2019 | Meng ................... G06V 10/751 |
| 2020/0084388 | A1 | 3/2020 | Iinuma et al. |
| 2021/0248400 | A1* | 8/2021 | Cronje ................. G06V 40/174 |

FOREIGN PATENT DOCUMENTS

JP    2018-160799 A    10/2018

* cited by examiner

*Primary Examiner* — Ryan W Sherwin
(74) *Attorney, Agent, or Firm* — Carrier Shende & Associates, P.C.; Joseph P. Carrier; Jeffrey T. Gedeon

(57) ABSTRACT

An occupant behavior determining apparatus includes a surveillance camera that captures an image of an occupant of a vehicle to acquire an image; a face recognizing section that recognizes a face of the occupant based on the image; a posture recognizing section that recognizes a posture of the occupant based on the image; and a behavior determining section that determines a behavior of the occupant in a vehicle cabin based on a recognition result of the face recognizing section and a recognition result of the posture recognizing section.

8 Claims, 6 Drawing Sheets

| RECOGNITION RESULT | BEHAVIOR |
|---|---|
| ORIENTATION OF FACE OR SIGHT LINE OF DRIVER IS NOT FORWARD | LOOKING ASIDE |
| HAND OF OCCUPANT IS MOVING BACK AND FORTH BETWEEN LOCATION NEAR MOUTH AND LOCATION AWAY FROM MOUTH | EATING, DRINKING, OR SMOKING |
| OBJECT IS SMARTPHONE | MANIPULATING SMARTPHONE |
| NEARBY OBJECT (FINGER OR PALM OF OCCUPANT) RECOGNIZED | MANIPULATING NAVIGATION APPARATUS |

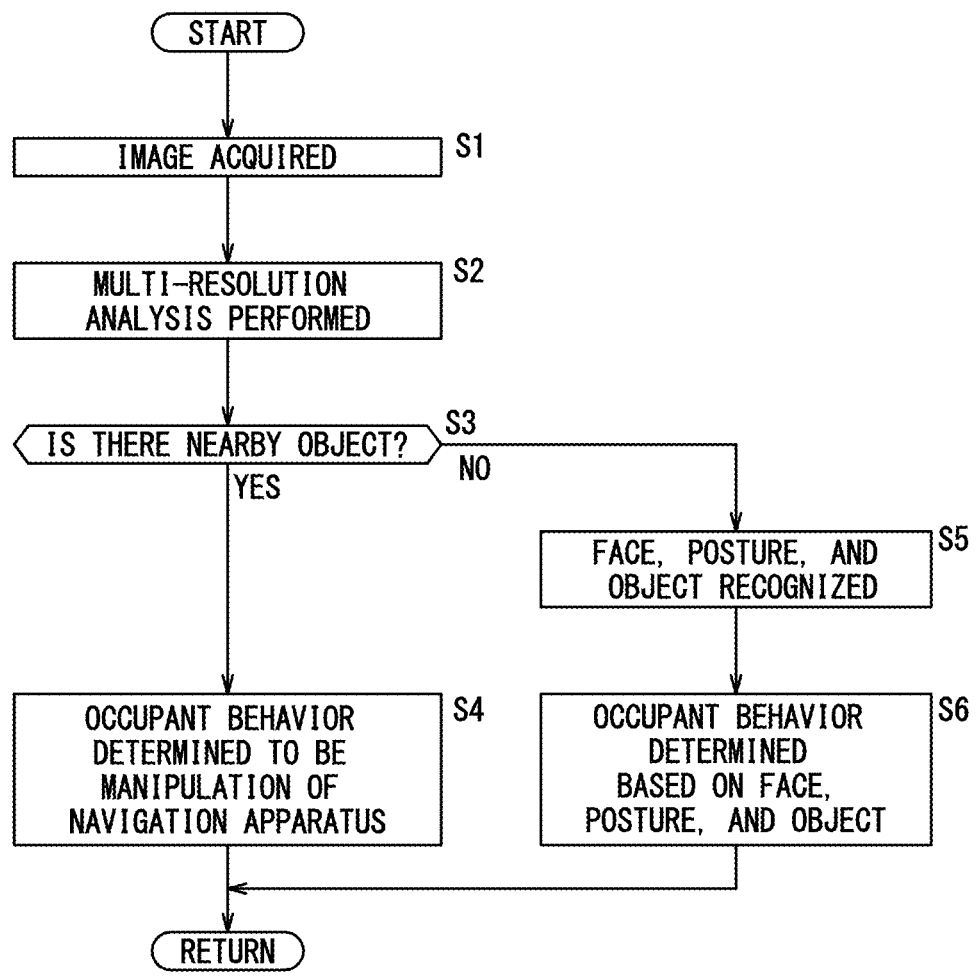

OCCUPANT BEHAVIOR DETERMINING APPARATUS, OCCUPANT BEHAVIOR DETERMINING METHOD, AND STORAGE MEDIUM

CROSS-REFERENCE TO RELATED APPLICATION

This application is based upon and claims the benefit of priority from Japanese Patent Application No. 2020-037337 filed on Mar. 5, 2020, the contents of which are incorporated herein by reference.

BACKGROUND OF THE INVENTION

Field of the Invention

The present invention relates to an occupant behavior determining apparatus, an occupant behavior determining method, and a storage medium for determining the behavior of an occupant of a vehicle, based on an image captured by a camera.

Description of the Related Art

Japanese Laid-Open Patent Publication No. 2018-160799 discloses technology for performing facial recognition on an occupant, based on an image captured by a camera. This technology causes the image sensor of the camera to operate in a low-power mode for outputting an image with low resolution (low-resolution image) and a normal mode for outputting an image with high resolution (high-resolution image). Specifically, with this technology, when the image sensor is made to operate in the low-power mode and the face of the occupant is detected based on the low-resolution image, the image sensor is then made to operate in the normal mode to perform facial recognition based on the high-resolution image.

The image of the face of the occupant acquired by the camera is used for facial recognition of the occupant, and also for determining the behavior of the occupant. For example, it is possible to detect the line of sight of the occupant or the orientation of the face of the occupant from the image of the face of the occupant, and it is possible to determine whether the occupant is looking aside.

SUMMARY OF THE INVENTION

Various services provided to occupants of vehicles are being developed. In accordance with the increase in services, there is a desire to determine various activities performed by occupants. However, there is a limit to the activities of an occupant that can be determined just by acquiring an image of the face of the occupant such as described in Japanese Laid-Open Patent Publication No. 2018-160799.

The present invention has been devised taking into consideration the aforementioned problem, and has the object of providing an occupant behavior determining apparatus, an occupant behavior determining method, and a storage medium that can determine various activities of an occupant.

A first aspect of the present invention comprises a camera configured to capture an image of an occupant of a vehicle to acquire an image; a face recognizing section configured to recognize a face of the occupant based on the image; a posture recognizing section configured to recognize a posture of the occupant based on the image; and a behavior determining section configured to determine a behavior of the occupant in a vehicle cabin based on a recognition result of the face recognizing section and a recognition result of the posture recognizing section.

A second aspect of the present invention is an occupant behavior determining method comprising: recognizing a face of an occupant of a vehicle based on an image of the occupant captured by a camera; recognizing a posture of the occupant based on the image; and determining a behavior of the occupant in a vehicle cabin based on a recognition result of the face of the occupant and a recognition result of the posture of the occupant.

A third aspect of the present invention is a non-transitory computer-readable storage medium storing a program for causing a computer to: recognize a face of an occupant of a vehicle based on an image of the occupant captured by a camera; recognize a posture of the occupant based on the image; and determine a behavior of the occupant in a vehicle cabin based on a recognition result of the face of the occupant and a recognition result of the posture of the occupant.

According to the present invention, it is possible to determine various activities of the occupant.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a diagram showing recognition-behavior information;

FIG. 4 is a flow chart of a behavior determination process;

DESCRIPTION OF THE PREFERRED EMBODIMENTS

Preferred embodiments of an occupant behavior determining apparatus, an occupant behavior determining method, and a storage medium according to the present invention will be presented and described below with reference to the accompanying drawings.

[1. Configuration of an Occupant Behavior Determining Apparatus 10]

Figure 1:
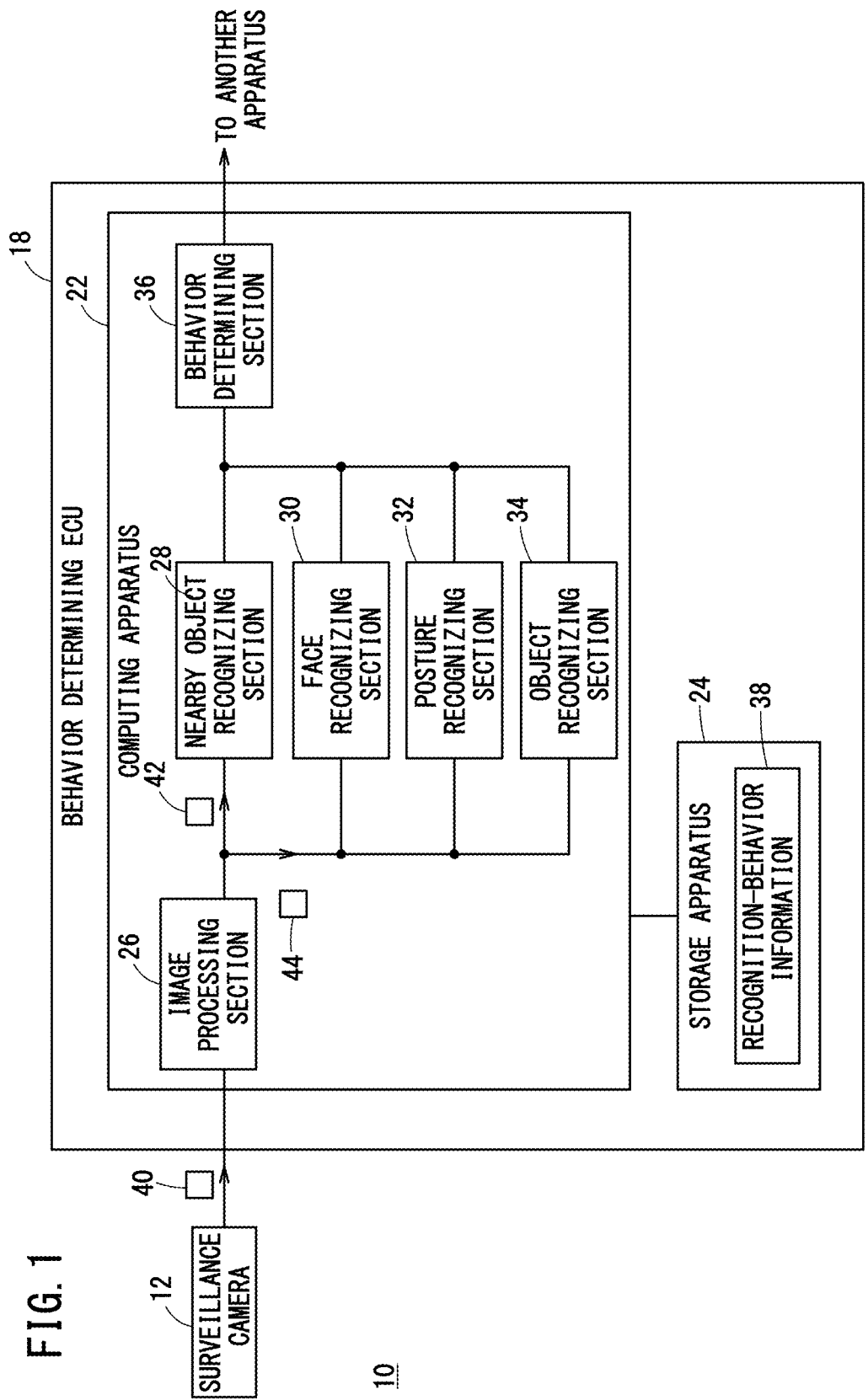
FIG. 1 is a block diagram of an occupant behavior determining apparatus.

The configuration of the occupant behavior determining apparatus 10 is described using FIG. 1. The occupant behavior determining apparatus 10 is provided to a vehicle. The occupant behavior determining apparatus 10 includes a surveillance camera 12 and a behavior determining ECU 18.

Figure 2:
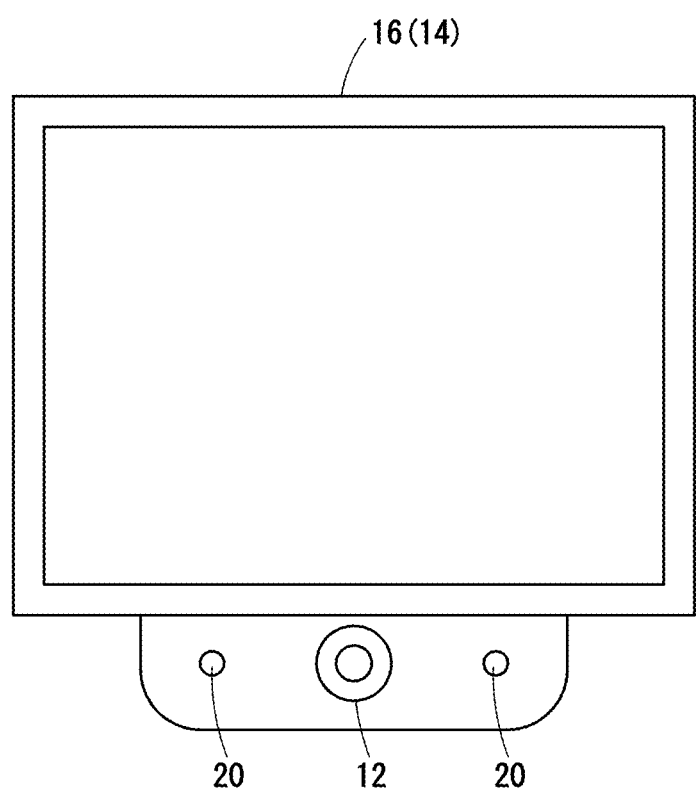
FIG. 2 is a diagram showing a navigation apparatus and a surveillance camera.

The surveillance camera 12 is a camera that captures images inside the vehicle cabin. As shown in FIG. 2, the surveillance camera 12 is provided near a manipulated device 14 of the vehicle, which is manipulated by a finger of the occupant. In the present embodiment, the manipulated device 14 is a navigation apparatus 16. The manipulated device 14 may be any of a variety of switches, such as a switch of an air-conditioning apparatus, for example. The surveillance camera 12 outputs a captured image 40 to the behavior determining ECU 18. A near-infrared LED 20, used for auxiliary lighting, is provided near the surveillance camera 12.

The behavior determining ECU 18 includes a computing apparatus 22 that has a processor; a storage apparatus 24 that has a RAM, a ROM, and the like; an input/output interface (not shown in the drawings); and the like. The computing apparatus 22 functions as an image processing section 26, a nearby object recognizing section 28, a face recognizing section 30, a posture recognizing section 32, an object recognizing section 34, and a behavior determining section 36 by executing a program stored in the storage apparatus 24.

The image processing section 26 performs a multi-resolution analysis using the image 40 captured by the surveillance camera 12, to generate a high-resolution image 44 that has a relatively high resolution and a low-resolution image 42 that has a relatively low resolution. The high-resolution image 44 has a higher resolution than the low-resolution image 42, and the low-resolution image 42 has a lower resolution than the high-resolution image 44.

The nearby object recognizing section 28 recognizes objects that are near the surveillance camera 12 and the presence or absence of these nearby objects, based on the low-resolution image 42 generated by the image processing section 26. The face recognizing section 30 recognizes the face of the occupant based on the high-resolution image 44 generated by the image processing section 26, and recognizes the orientation of the face and the orientation of the line of sight of the occupant. The posture recognizing section 32 recognizes the posture of the occupant based on the high-resolution image 44 generated by the image processing section 26. The object recognizing section 34 recognizes objects held by the occupant, based on the high-resolution image 44 generated by the image processing section 26.

The behavior determining section 36 determines the behavior of the occupant in the vehicle cabin, based on the recognition result of the nearby object recognizing section 28, the recognition result of the face recognizing section 30, the recognition result of the posture recognizing section 32, and the recognition result of the object recognizing section 34. The determination result of the behavior determining section 36 is output to an apparatus (ECU) that uses the information of the occupant behavior, such as an information providing apparatus that provides recommendation information to the occupant or a notification apparatus that prompts the occupant to pay attention, for example.

The storage apparatus 24 stores recognition-behavior information 38, in addition to various programs. The recognition-behavior information 38 is information in which the recognition results obtained by the various recognizing sections and types of occupant behavior estimated from these recognition results are associated with each other. As an example, this information is an association pattern between the recognition results and the activities, such as shown below.

As an example, in a case where the orientation of the face or the orientation of the line of sight of the occupant sitting in the driver's seat (the driver) is a direction other than forward, there is a possibility that the driver is looking aside. Therefore, in the recognition-behavior information 38, as shown in FIG. 3, the behavior of looking aside is associated with the recognition result of the orientation of the face or line of sight of the driver being a direction other than forward.

As an example, if the occupant is eating, drinking, or smoking in the vehicle cabin, there is a possibility that a hand of the occupant is moving back and forth between a location near the mouth and a location away from the mouth. Therefore, in the recognition-behavior information 38, as shown in FIG. 3, the behavior of eating, drinking, or smoking is associated with the recognition result of the hand of the occupant moving back and forth between a location near the mouth and a location away from the mouth.

As an example, if the occupant is holding a smartphone, there is a possibility that the occupant is making a call, sending an email, or searching for information. Therefore, in the recognition-behavior information 38, as shown in FIG. 3, the behavior of manipulating a smartphone is associated with the object that is a smartphone.

As an example, if the occupant is manipulating the navigation apparatus 16, the occupant performs a switching manipulation near the surveillance camera 12 that is near the navigation apparatus 16. At this time, there is a high possibility that the finger or palm of the occupant is blocking the lens of the surveillance camera 12. When this happens, the finger or palm of the occupant near the lens takes up a large portion of the image 40 captured by the surveillance camera 12 at this time. Therefore, in the recognition-behavior information 38, as shown in FIG. 3, the behavior of manipulating the navigation apparatus 16 is associated with the recognition result of the surveillance camera 12 recognizing a nearby object (the finger or palm of the occupant).

[2. Process Performed by the Occupant Behavior Determining Apparatus 10]

The process performed by the occupant behavior determining apparatus 10 is described using FIG. 4. The process shown in FIG. 4 is performed repeatedly from when the vehicle starts up in response to the manipulation of a switch (ignition switch, start switch, or the like) to when the vehicle stops in response to a manipulation of the switch.

At step S1, the surveillance camera 12 acquires the image 40 by capturing an image of the occupant. The surveillance camera 12 outputs the image 40 to the behavior determining ECU 18.

At step S2, the image processing section 26 performs the multi-resolution analysis using the image 40 output by the surveillance camera 12, to generate the low-resolution image 42 and the high-resolution image 44.

Figure 5B:
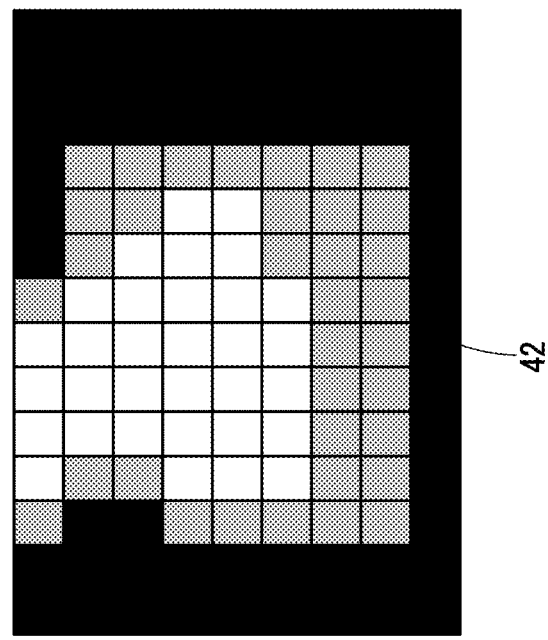
FIG. 5B is a diagram showing a low-resolution image.
Figure 5A:
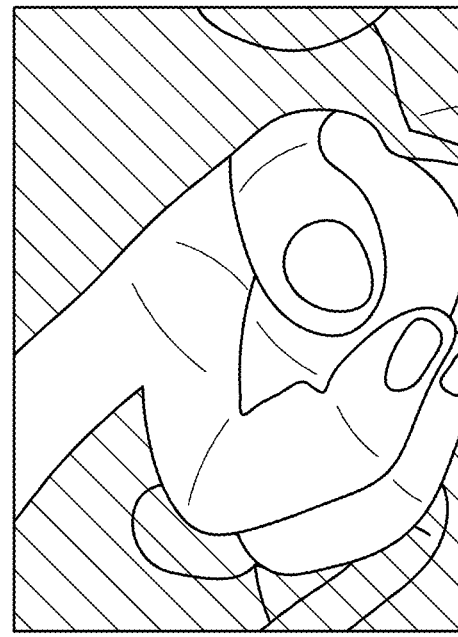
FIG. 5A is a diagram showing a high-resolution image.

At step S3, the nearby object recognizing section 28 recognizes the presence or absence of a nearby object that is close to the surveillance camera 12, based on the low-resolution image 42. When a finger or the like of the occupant approaches the lens of the surveillance camera 12, the finger or the like is illuminated by the near-infrared LED 20. Therefore, the image 40 contains many overexposed areas. As shown in FIGS. 5A and 5B, the overexposed areas occur regardless of the resolution. Accordingly, even with the low-resolution image 42, the nearby object recognizing section 28 can recognize the presence or absence of a nearby object by determining the ratio of overexposed area contained therein. A threshold value for recognizing the presence or absence of a nearby object is stored in advance in the storage apparatus 24. If there is a nearby object that is near the surveillance camera 12 (step S3: YES), the process moves to step S4. On the other hand, if there are no nearby objects that are near the surveillance camera 12 (step S3: NO), the process moves to step S5.

At step S4, the behavior determining section 36 determines the behavior of the occupant based on the recognition result of the nearby object recognizing section 28. The behavior determining section 36 determines the behavior of the occupant to be manipulation of the navigation apparatus 16, based on the recognition-behavior information 38.

At step S5, the face recognizing section 30 recognizes the face of the occupant based on the high-resolution image 44. Furthermore, the posture recognizing section 32 recognizes the posture of the occupant based on the high-resolution image 44. Yet further, the object recognizing section 34 recognizes objects held by the occupant based on the high-resolution image 44.

At step S6, the behavior determining section 36 determines the behavior of the occupant based on the recognition result of the face recognizing section 30, the recognition result of the posture recognizing section 32, and the recognition result of the object recognizing section 34. Here, the behavior determining section 36 references the recognition-behavior information 38, specifies the behavior that is associated with the recognition result of the face recognizing section 30, and determines this specified behavior to be the behavior of the occupant. Furthermore, the behavior determining section 36 references the recognition-behavior information 38, specifies the behavior that is associated with the recognition result of the posture recognizing section 32, and determines this specified behavior to be the behavior of the occupant. Yet further, the behavior determining section 36 references the recognition-behavior information 38, specifies the behavior that is associated with the recognition result of the object recognizing section 34, and determines this specified behavior to be the behavior of the occupant.

At step S6, there can be both cases where the behavior determining section 36 determines there to be one or more occupant activities and cases where the behavior determining section 36 cannot determine even one behavior. If a plurality of occupant activities are determined, the behavior determining section 36 may select one of these activities.

[3. Significance of Behavior Determination Based on a Nearby Object]

In the present embodiment, nearby object recognition is performed in addition to the facial recognition, posture recognition, and object recognition. The significance of making the behavior determination based on the recognition of a nearby object is described using FIGS. 6A and 6B.

Figure 6A:
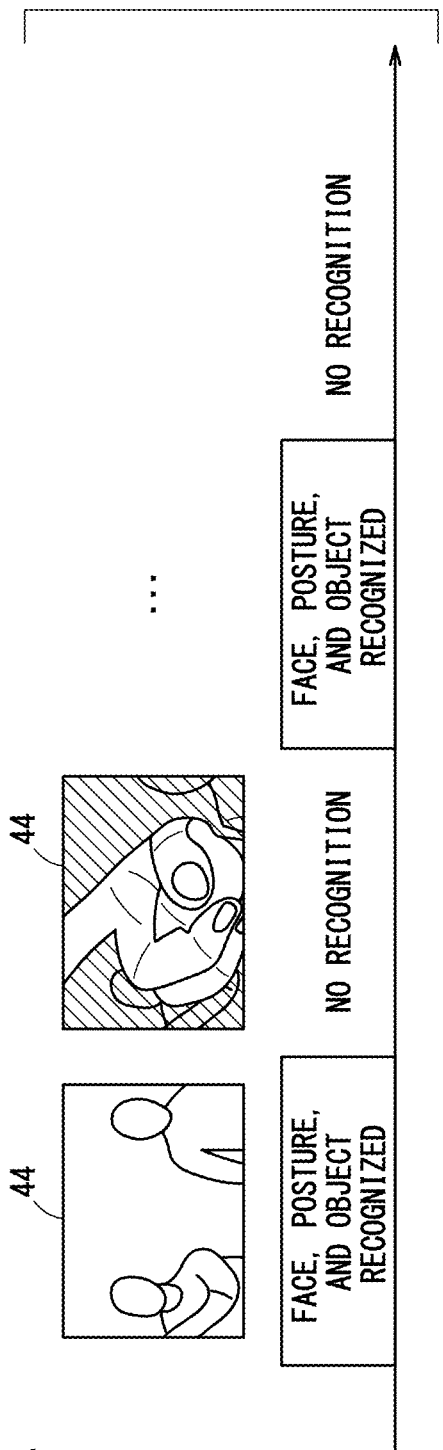
FIG. 6A is a diagram showing a transition of a recognition state.

In order to determine the behavior based on facial recognition, it is necessary to capture an image of the face of the occupant with the surveillance camera 12. In order to determine the behavior based on posture recognition, it is necessary to capture an image of the posture of the occupant with the surveillance camera 12. In order to determine the behavior based on object recognition, it is necessary to capture an image of the object with the surveillance camera 12. However, when the surveillance camera 12 is provided near the manipulated device 14 (navigation apparatus 16) as in the present embodiment, the lens of the surveillance camera 12 is blocked by the finger or palm of the occupant when this manipulated device 14 is manipulated. When this happens, it becomes temporarily impossible to perform the facial recognition, posture recognition, and object recognition. At this time, as shown in FIG. 6A, it becomes temporarily impossible to perform the behavior determination.

Figure 6B:
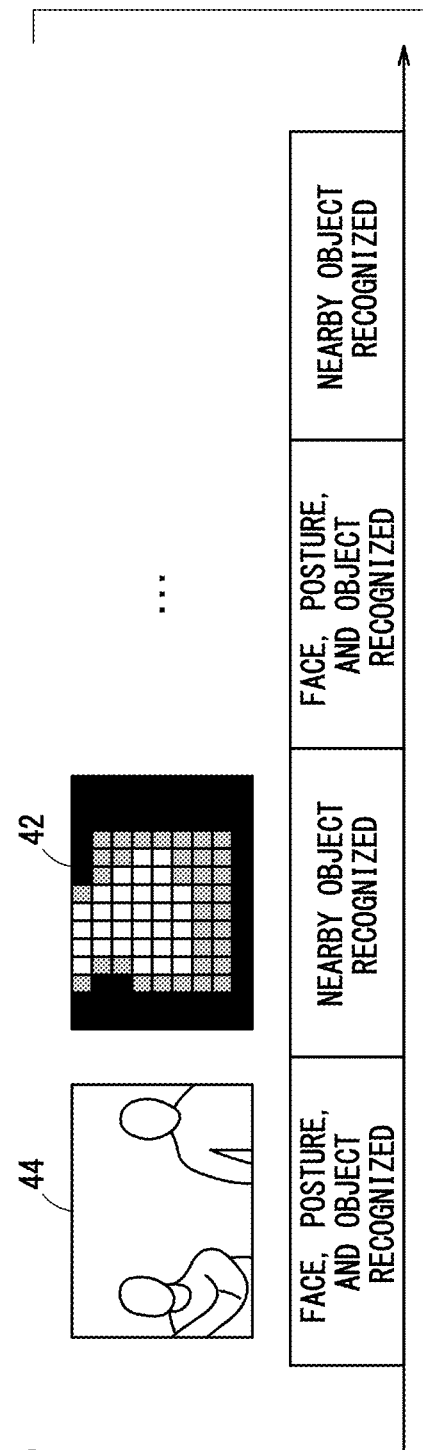
FIG. 6B is a diagram showing a transition of a recognition state.

On the other hand, by adding the nearby object recognition as in the present embodiment, some type of recognition is performed continuously. Accordingly, as shown in FIG. 6B, the present embodiment can perform a continuous behavior determination.

[4. Modifications]

In the embodiment described above, the behavior determination is performed based on nearby object recognition. However, the behavior determination does not need to be performed based on nearby object recognition. In such a case, at least a behavior determination based on facial recognition and a behavior determination based on posture recognition should be performed. Furthermore, it is more preferable to perform the behavior determination based on object recognition.

Furthermore, the facial recognition, posture recognition, object recognition, and nearby object recognition may be performed based on images 40 of the same resolution.

[5. Technical Concepts Obtainable from the Embodiment]

The following is a record of technical concepts that can be understood from the embodiment and modifications described above.

One aspect of the present invention comprises:

a surveillance camera 12 that captures an image of an occupant of a vehicle to acquire an image 40;

a face recognizing section 30 that recognizes a face of the occupant based on the image 40;

a posture recognizing section 32 that recognizes a posture of the occupant based on the image 40; and a behavior determining section 36 that determines a behavior of the occupant in a vehicle cabin based on a recognition result of the face recognizing section 30 and a recognition result of the posture recognizing section 32.

According to the above configuration, since not only the face of the occupant, but also the posture of the occupant, is recognized, it is possible to determine various activities of the occupant.

In one aspect of the present invention:

an object recognizing section 34 that recognizes an object held by the occupant based on the image 40 may be further included, and the behavior determining section 36 may determine the behavior of the occupant based on the recognition result of the face recognizing section 30, the recognition result of the posture recognizing section 32, and a recognition result of the object recognizing section 34.

According to the above configuration, since the object held by the occupant is recognized, it is possible to determine the behavior of the occupant whose behavior is difficult to determine from just the face and posture of the occupant.

In one aspect of the present invention:

a nearby object recognizing section 28 that recognizes a nearby object (finger or palm) that is close to the surveillance camera 12 based on the image 40 may be further included, an image processing section 26 that generates, from the image 40, a high-resolution image 44 having a relatively high resolution and a low-resolution image 42 having a relatively low resolution may be further included, the face recognizing section 30 and the posture recognizing section 32 may perform recognition based on the high-resolution image 44, and the nearby object recognizing section 28 may perform recognition based on the low-resolution image 42.

According to the above configuration, since the facial recognition process and the posture recognition process are performed using the high-resolution image 44, it is possible to increase the accuracy of the behavior determination that is based on the face and posture of the occupant. Furthermore, in the above configuration, the nearby object recognition process is performed using the low-resolution image 42. When a finger or the like of the occupant is near the lens of the surveillance camera 12, overexposed areas take up a large portion of the image 40. This overexposure occurs regardless of the resolution. Accordingly, it is possible to recognize whether a nearby object is present even using the low-resolution image 42. Recognition processes that use the low-resolution image 42 have a lower computational load than recognition processes that use the high-resolution image 44.

In one aspect of the present invention:

the surveillance camera 12 may be provided near a manipulated device 14 (navigation apparatus 16) of the vehicle that is to be manipulated by a finger of the occupant, and the behavior determining section 36 may determine the behavior of the occupant to be manipulation of the manipulated device 14 if the nearby object recognizing section 28 recognizes the nearby object (finger or palm).

According to the above configuration, even in a situation where it is difficult to perform the recognition process of the face of the occupant and the recognition process of the posture of the occupant, since the manipulated device 14 is provided near the surveillance camera 12, it is possible to determine the behavior of the occupant from the situation of the surveillance camera 12 being blocked.

The occupant behavior determining apparatus, the occupant behavior determining method, and the storage medium according to the present invention is not limited to the above-described embodiments, and it goes without saying that various configurations could be adopted therein without departing from the scope of the present invention.

What is claimed is:

1. An occupant behavior determining apparatus comprising:
    a camera configured to capture an image of an occupant of a vehicle to acquire an image; and
    one or more processors that execute computer-executable instructions stored in a memory, wherein
    the one or more processors execute the computer-executable instructions to cause the occupant behavior determining apparatus to:
    generate, from the image, a high-resolution image having a relatively high resolution compared to a low-resolution image, and the low-resolution image having a relatively low resolution compared to the high-resolution image;
    determine presence or absence of a nearby object that is close to the camera, based on the low-resolution image;
    in case of the presence of the nearby object, determine a behavior of the occupant in a vehicle cabin based on the low-resolution image; and
    in case of the absence of the nearby object, recognize the face of the occupant and the posture of the occupant based on the high-resolution image, and
    determine a behavior of the occupant in the vehicle cabin based on a recognition result of the face of the occupant and a recognition result of the posture of the occupant.

2. The occupant behavior determining apparatus according to claim 1, wherein the one or more processors cause the occupant behavior determining apparatus to:
    recognize an object held by the occupant based on the image; and
    determine the behavior of the occupant based on the recognition result of the face of the occupant, the recognition result of the posture of the occupant, and a recognition result of the object held by the occupant.

3. The occupant behavior determining apparatus according to claim 1, wherein the camera is provided near a manipulated device of the vehicle that is to be manipulated by a finger of the occupant, and
the one or more processors cause the occupant behavior determining apparatus to determine the behavior of the occupant to be manipulation of the manipulated device if the nearby object is recognized.

4. An occupant behavior determining method, comprising:
    generating, by a computer, from an image of the occupant captured by a camera, a high-resolution image having a relatively high resolution compared to a low-resolution image, and the low-resolution image having a relatively low resolution compared to the high-resolution image;
    determining, by the computer, presence or absence of a nearby object that is close to the camera, based on the low-resolution image;
    in case of the presence of the nearby object, determining, by the computer, a behavior of the occupant in a vehicle cabin based on the low-resolution image; and
    in case of the absence of the nearby object, recognizing, by the computer, the face of the occupant and the posture of the occupant based on the high-resolution image, and
    determining, by the computer, a behavior of the occupant in the vehicle cabin based on a recognition result of the face of the occupant and a recognition result of the posture of the occupant.

5. The occupant behavior determining method according to claim 4, further comprising:
    recognizing, by the computer, an object held by the occupant based on the image; and
    determining, by the computer, the behavior of the occupant based on the recognition result of the face of the occupant, the recognition result of the posture of the occupant, and a recognition result of the object held by the occupant.

6. The occupant behavior determining method according to claim 4,
    wherein
    the camera is provided near a manipulated device of the vehicle that is to be manipulated by a finger of the occupant, and
    the occupant behavior determining method further comprises determining, by the computer, the behavior of the occupant to be manipulation of the manipulated device if the nearby object is recognized.

7. A non-transitory computer-readable storage medium storing a program for causing a computer to:
    generate, from an image of the occupant captured by a camera, a high-resolution image having a relatively high resolution compared to a low-resolution image, and the low-resolution image having a relatively low resolution compared to the high-resolution image;
    determine presence or absence of a nearby object that is close to the camera, based on the low-resolution image;
    in case of the presence of the nearby object, determine a behavior of the occupant in a vehicle cabin based on the low-resolution image; and
    in case of the absence of the nearby object, recognize the face of the occupant and the posture of the occupant based on the high-resolution image, and
    determine a behavior of the occupant in the vehicle cabin based on a recognition result of the face of the occupant and a recognition result of the posture of the occupant.

8. The non-transitory computer-readable storage medium according to claim 7, wherein the program further causes the computer to:
   recognize an object held by the occupant based on the image; and
   determine the behavior of the occupant based on the recognition result of the face of the occupant, the recognition result of the posture of the occupant, and a recognition result of the object held by the occupant.

* * * * *